United States Patent [19]

Nakayama et al.

[11] Patent Number: 5,415,899
[45] Date of Patent: May 16, 1995

[54] METHOD OF FORMING AN ORGANIC THIN FILM

[75] Inventors: Toshio Nakayama, Fujisawa; Syun Egusa; Nobuhiro Gemma, both of Yokohama; Akira Miura, Toride, all of Japan

[73] Assignee: Kabushiki Kaisha Toshiba, Kawasaki, Japan

[21] Appl. No.: 70,973

[22] Filed: Jun. 4, 1993

Related U.S. Application Data

[63] Continuation of Ser. No. 879,468, May 4, 1992, Pat. No. 5,286,529, which is a continuation of Ser. No. 686,858, Apr. 18, 1991, abandoned, which is a continuation of Ser. No. 314,135, Feb. 23, 1989, abandoned.

[30] Foreign Application Priority Data

Feb. 24, 1988 [JP] Japan .................. 63-39590
Mar. 25, 1988 [JP] Japan .................. 63-69645
Dec. 27, 1988 [JP] Japan .................. 63-327592

[51] Int. Cl.$^6$ .............................. B05D 1/20
[52] U.S. Cl. .................. 427/430.1; 427/434.3; 118/402
[58] Field of Search ............ 427/430.1, 434.3; 118/402, 408, 409, 410

[56] References Cited

U.S. PATENT DOCUMENTS 4,599,969 7/1986 Barraud et al. ............... 118/429
4,716,851 1/1988 Saito et al. .................. 427/434.3

OTHER PUBLICATIONS

David Day and J. B Lando, Morphology of Crystilline Diacetylene Monolayers Polymerizeat at the Gas-WaterInterface, Macromolecules 198,13, Nov.–Dec. 1980.
Kiyoshige Fukuda, et al, Monolayers and Multilayers of Anthraquinone Derivatives Containing Long Alkyl Chains, Journal of Colloid and Interface Science, vol. 54, No. 3, Mar. 1976.

*Primary Examiner*—Shrive Beck
*Assistant Examiner*—Katherine A. Bareford
*Attorney, Agent, or Firm*—Oblon, Spivak, McClelland, Maier, & Neustadt

[57] ABSTRACT

A method of forming an organic thin film includes developing organic molecules having a hydrophilic portion and a hydrophobic portion on a water surface, and compressing the organic molecules thereby to form a monomolecular layer of a predetermined surface pressure. The monomolecular layer is brought into contact with a given substrate. Then, the substrate to which the monomolecular layer is adhered, is pulled at such a rate that the surface pressure is not substantially lowered, thus transferring the monomolecular layer onto the substrate.

10 Claims, 6 Drawing Sheets

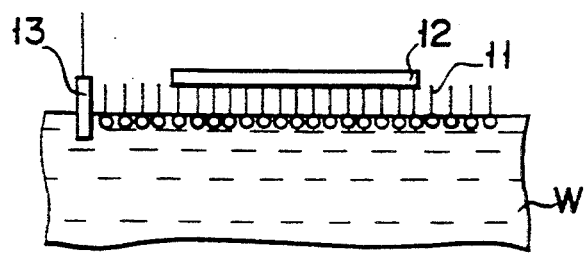
F I G. 1A
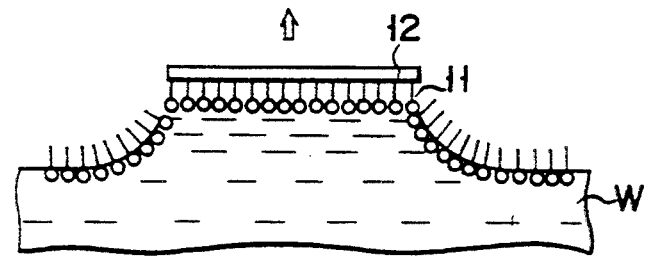
F I G. 1B
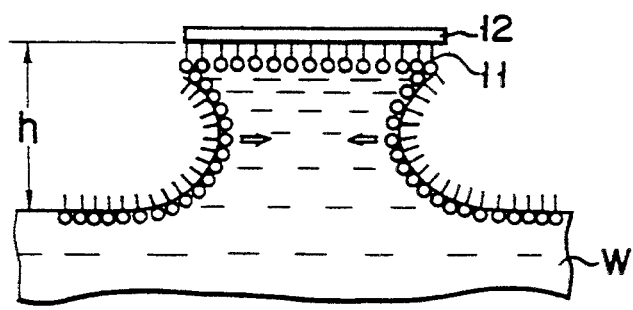
F I G. 1C
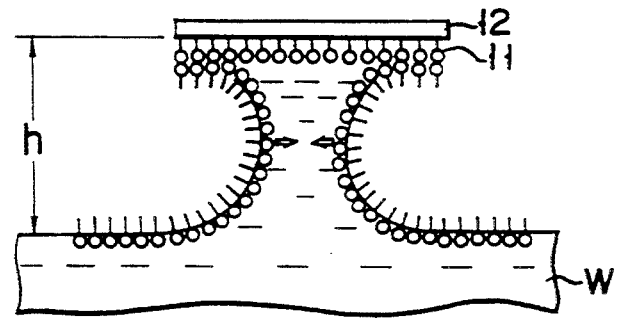
F I G. 1D
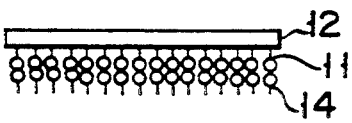
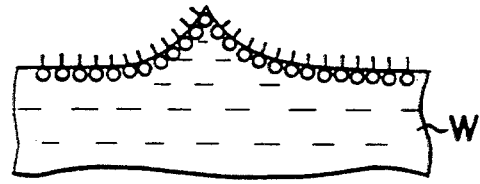
F I G. 1E

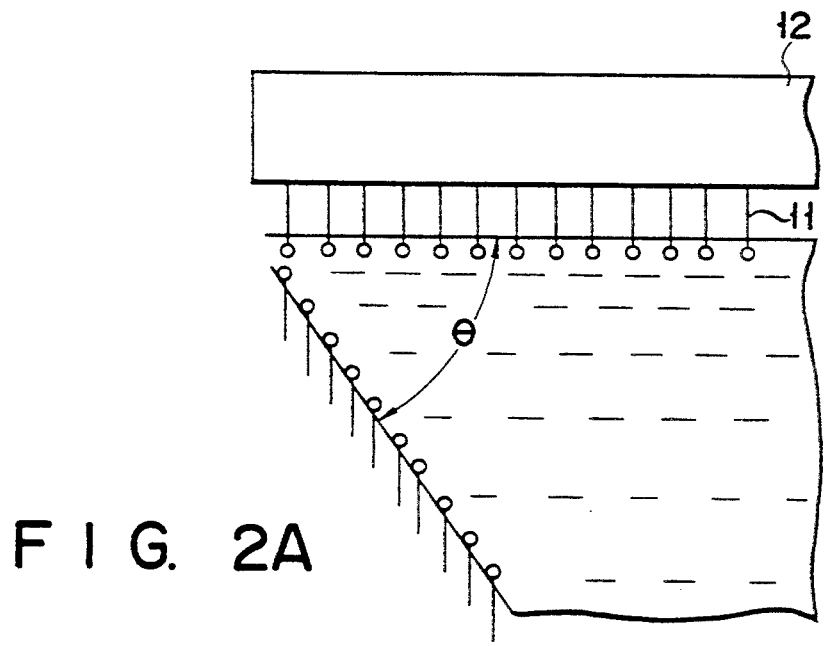
F I G. 2A
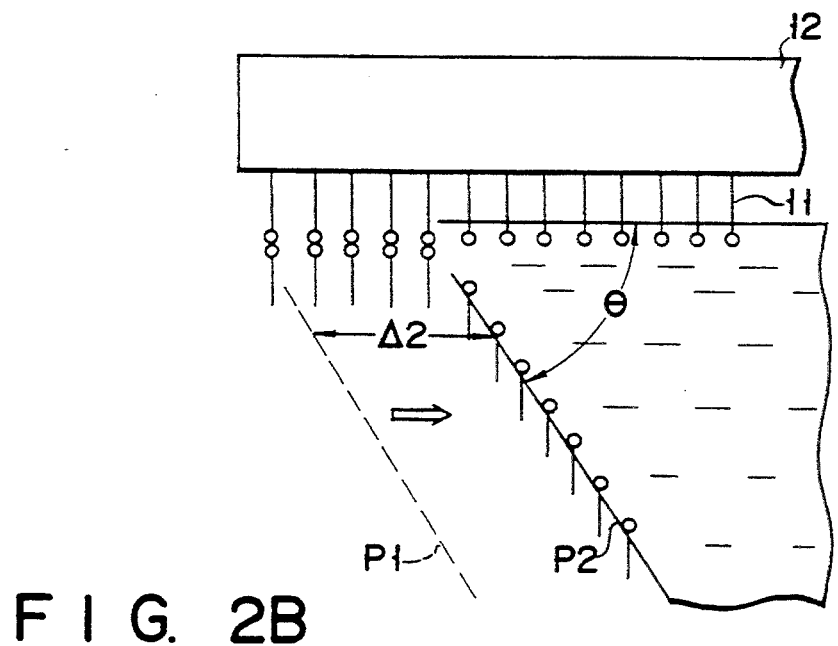
F I G. 2B

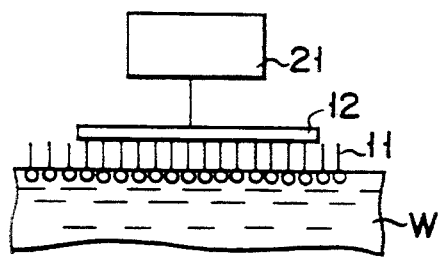
F I G. 3A
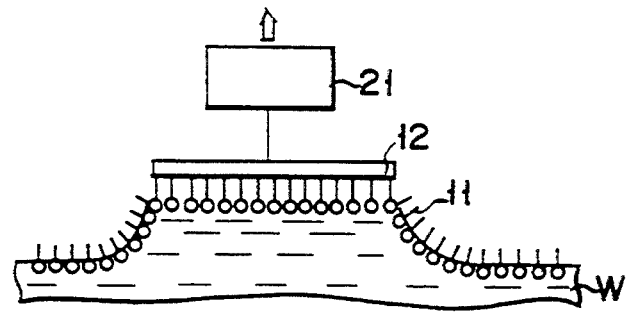
F I G. 3B
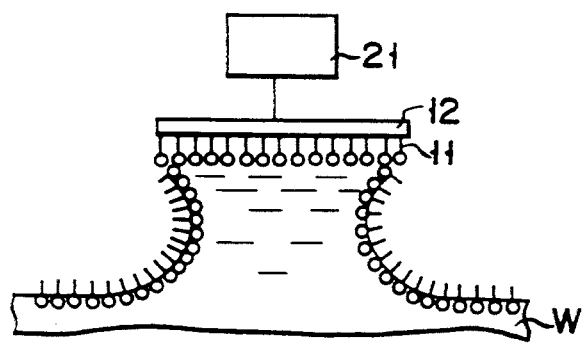
F I G. 3C
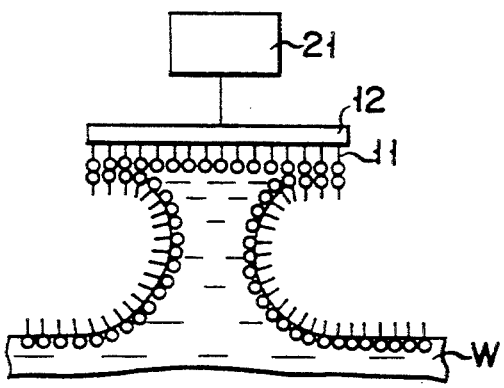
F I G. 3D
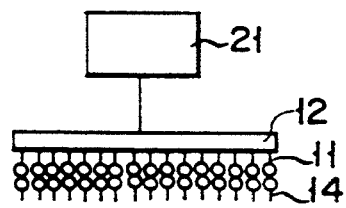
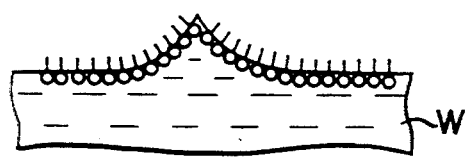
F I G. 3E F I G. 4A
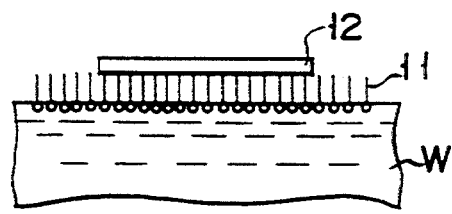
F I G. 4B
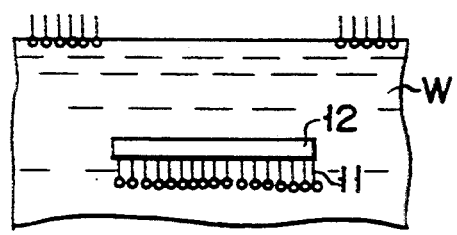
F I G. 4C
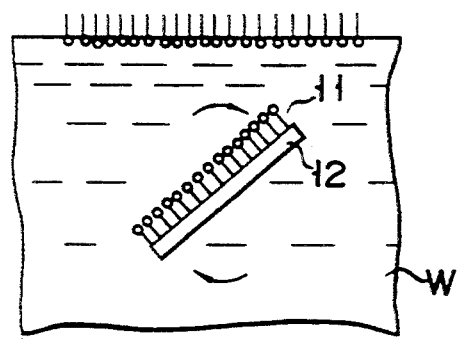
F I G. 4D
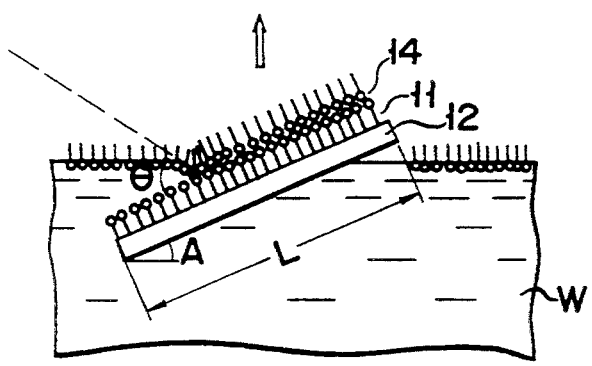
F I G. 4E
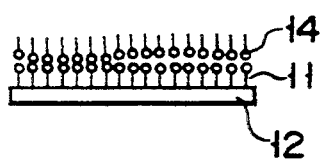

F I G. 5A
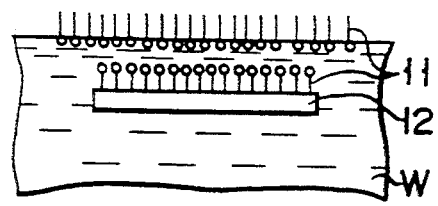
F I G. 5B
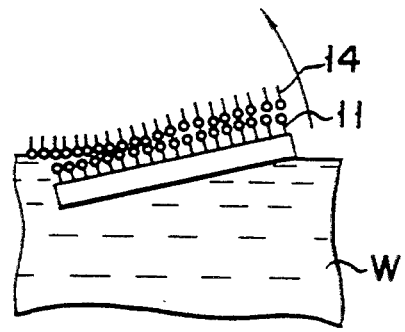
F I G. 6A
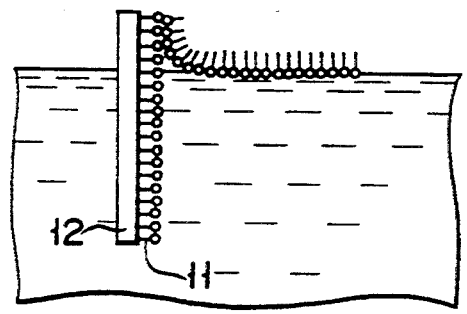
F I G. 6B
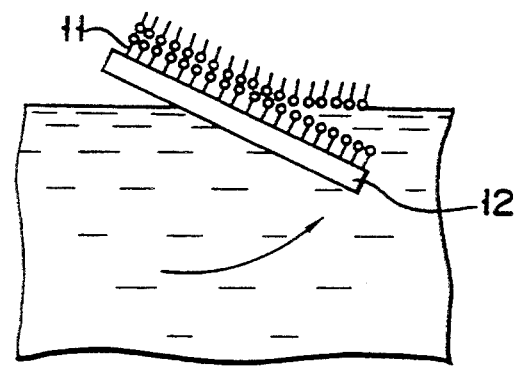

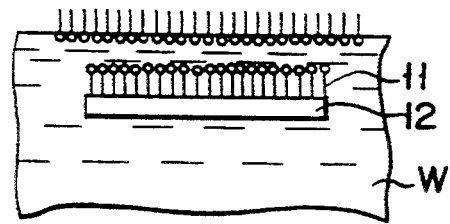
F I G. 7A
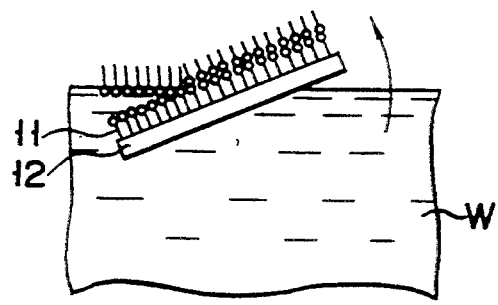
F I G. 7B
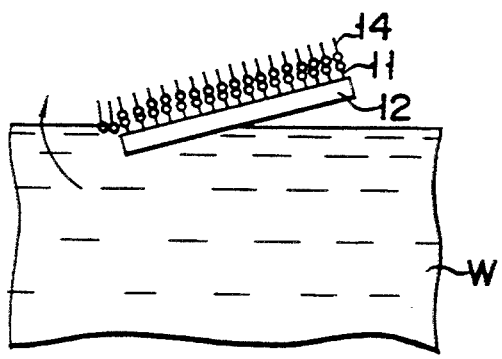
F I G. 7C

METHOD OF FORMING AN ORGANIC THIN FILM

This is a continuation of application Ser. No. 07/879,468, filed May 4, 1992, now U.S. Pat. No. 5,286,529, which is a continuation of Ser. No. 07/686,858, filed Apr. 18, 1991, now abandoned, which is a continuation of Ser. No. 07/314,135, filed Feb. 23, 1989, now abandoned.

BACKGROUND OF THE INVENTION

1. Field of the Invention

The present invention relates to a method of forming an organic thin film by stacking monomolecular layers using the Langmuir-Blodgett's technique, and, more particularly, to a method of forming an organic thin film having a uniform Y-type stacking structure.

2. Description of the Related Art

Recently, organic thin films (LB film) formed by the Langmuir-Blodgett's technique have been widely studied for the purpose of applications to various types of devices with new functions. If the LB film is used, a device having a desired function may be obtained by controlling the orientation, stacking structure, and inter-molecular distance of functional molecules having a dyestuff skeleton within the film.

In general, the LB film can be obtained in the following manner. At first, amphiphatic organic molecules, each having a hydrophilic portion and a hydrophobic portion is developed over the water surface. The area of the water surface on with the molecules have been developed is then reduced so that a predetermined surface pressure can be obtained, thereby forming a monomolecular layer on the water surface. Then, the monomolecular layer is taken up on a given substrate. Methods of taking up the monomolecular layer on the substrate includes a vertical dipping method, wherein the substrate is vertically dipped in the water surface over which the monomolecular layer is developed, and a horizontal adhesion method, wherein the substrate is adhered to the monomolecular layer and is then pulled up, while the substrate is kept in parallel to the water surface. In forming the LB film, it is necessary to the surface pressure of the monomolecular layer be constantly kept at a predetermined value or above. In a conventional LB film forming apparatus, when the 10 substrate is pulled up, the lowering of the surface pressure due to the removal of the monomolecular layer portion on the water surface near the substrate is immediately transmitted to the entire monomolecular layer. The lowering in surface pressure must be detected by a surface pressure measuring device arranged at a given position in a water reservoir, and a feedback operation must be performed so as to keep the surface pressure at a constant value. The inventors of the present invention, however, has found that this condition can be satisfied only when limited types of aliphatic molecules are used. For example, according to the inventors' study, in the case of dye-containing molecules or high polymers, the viscoelasticity property of the monomolecular layer is high, and the lowering of surface pressure in the vicinity of the substrate is not immediately transmitted to the surface pressure measuring device arranged remote from the substrate. It is thus difficult to keep a constant surface pressure in stacking monomolecular layers of dye-containing molecules or high polymers by using, for example, the vertical dipping method. Namely, the density and molecular orientation of the monomolecular layer are changed, resulting in the formation of a non-uniform, defective stacked LB film.

Considering prior studies relating to the horizontal adhesion method, an excellent stacked film has not been obtained by this method, although in these studies the horizontal adhesion method were applied mainly to the formation of a polymerized film. It is generally considered that the stacking structure of the stacked film formed by the horizontal adhesion method is of the X type or Z type. In the X type or Z type stacking structure, the molecular orientation of an adhered layer and that of the next adhered layer are identical. In contrast, in the Y type stacking structure, hydrophilic radicals attract one another and hydrophobic radicals attract one another, that is, monomolecular layers are stacked with the molecular orientations of thereof being reversed alternately. In the case where a Y type stacked film can be formed by using amphiphatic molecules, such a stacked film, in fact, has not been obtained in the horizontal adhesion method. The reason for this seems to be that a step of pulling up the substrate is not well controlled, and, even if the first layer is adhered with no problem, the water surface pressure in the vicinity of the substrate is lowered, and the structure of the second layer is deteriorated.

In order to prevent the deterioration in structure of the second layer in the case of the horizontal adhesion method, it is proposed to provide a partition wall surrounding the substrate to prevent the monomolecular layer outside the partition wall from flowing into within the partition wall, and the substrate is pulled up. However, in this case, since the hydrophilic radicals of the monomolecular layer attached on the pulled substrate appear on the surface side a great deal of water is attached to the hydrophilic radicals. This results in disturbance in structure of the next adhered film. Thus, a stacked film with high quality cannot be obtained.

As stated above, regarding the LB film stacking method using the conventional horizontal adhesion method, the stacking mechanism itself has not been fully understood, and therefore the control in the stacking process is not sufficient. Thus, an LB film with high quality has not been obtained.

Summary of the Invention

An object of the present invention is to provide method of forming an organic thin film consisting of stacked monomolecular layers with uniform structure, substantially involving no drawback stated above.

Another object of the present invention is to provide a method of forming an organic thin film having a uniform Y type stacking structure, by using a horizontal adhesion method.

According to the present invention, there is provided a method of forming an organic thin film comprising the steps of:

developing organic molecules having a hydrophilic portion and a hydrophobic portion on a water surface, and compressing the organic molecules thereby to form a monomolecular layer of a predetermined surface pressure;

bringing said monomolecular layer into contact with a given substrate, thus adhering the monomolecular layer to the substrate; and pulling up the substrate to which the monomolecular layer is adhered, at such a rate that the surface pressure at the monomolecular layer on the water surface is not substantially lowered, thus transferring the monomolecular layer onto the substrate.

According to a first aspect of the present invention, the substrate, to which the monomolecular layer is adhered, is pulled up from the water surface by a predetermined distance, at which a meniscus formed near the substrate spontaneously moves towards the center of the substrate. By utilizing this feature, the monomolecular layer is shifted onto the substrate.

According to a second aspect of this invention, the substrate, to which the monomolecular layer is adhered, is dipped in water, and the substrate is reversed so that the adhered monomolecular layer faces the water surface. In the state wherein the substrate is inclined at an angle to the water surface, the substrate having on its surface the monomolecular layer is pulled out of water, thus transferring the monomolecular layer onto the substrate.

BRIEF DESCRIPTION OF THE DRAWINGS

FIGS. 1A, 1B, 1C, 1D and 1E are views for explaining a method of forming an organic thin film according to a first embodiment of the present invention;

FIGS. 2A and 2B are views for explaining the state of movement of a meniscus in the first embodiment of the invention;

FIGS. 3A, 3C, 3D and 3E are views for explaining a method of forming an organic thin film according to a second embodiment of the present invention;

FIGS. 4A, 4B, 4C, 4D and 4E are views for explaining a method of forming an organic thin film according to a third embodiment of the present invention; and FIGS. 5A, 5B, 6A, 6B, 7A, 7B, and 7C are views for explaining a method of manufacturing organic thin films according to other various embodiments of the present invention.

DETAILED DESCRIPTION OF THE PREFERRED EMBODIMENTS

The inventors have studied, from thermodynamic aspects, a stacking mechanism by a horizontal adhesion method for a monomolecular layer of organic molecules having a hydrophilic portion and a hydrophobic portion. From this study, they have found that, in the process wherein monomolecular layers are stacked on one another with mutual adhesion of hydrophilic radicals of two adjacent monomolecular layers, an organic thin film with a uniform Y type stacking structure can be obtained by pulling up a substrate in a thermodynamical equilibrium state or a state similar to this. The condition for achieving the formation of this organic thin film has been found that, after the substrate is brought into contact with the organic monomolecular layer having a predetermined surface pressure is developed over the water surface, the substrate is pulled up at such a rate that the surface pressure is not substantially lowered.

In the present invention, any suitable organic compound (molecule) having a hydrophilic portion and a hydrophobic portion may be stacked to form an organic thin film. As is generally recognized in the art, the terms "hydrophilic" and "hydrophobic" are used herein in a relative meaning, and not used in absolute physical and/or chemical sense. In the case of an organic compound having two types of hydrophobic radicals (or hydrophilic radicals) in physical/chemical sense, if these two types of hydrophobic radicals (or hydrophilic radicals) have different levels of hydrophobic properties (or hydrophilic properties), this compound is defined as a compound having both a hydrophilic portion and a hydrophobic portion. In brief, any compound may be used, which can form a monomolecular layer of the same molecular orientations when it is developed on the water and compressed. The method of the present invention is most effective when it is applied to organic molecules having a dye radical or polymer molecules.

According to a first aspect of the present invention, a substrate, to which a monomolecular layer is adhered, is pulled up from the water surface at a predetermined distance. In this state, a meniscus formed near the substrate spontaneously moves towards the center of the substrate. By utilizing this feature, the monomolecular layer is taken up or transferred onto the substrate. The principle of the method of stacking the monomolecular layers according to the first aspect of the invention will now be described with reference to FIGS. 1A to 1E.

As shown in FIG. 1A, molecules of an organic compound are spread over the water surface W and compressed by a conventional method, so as to form monomolecular layer 11 having a predetermined surface pressure. The organic compound is oriented such that hydrophilic radicals (o) thereof are put in contact with water, and hydrophobic radicals (1) thereof project from water surface W. Substrate 12 is horizontally brought into contact with monomolecular layer 11, so that monomolecular layer 11 is adhered to substrate 12 at the hydrophobic radicals of layer 11.

In FIG. 1B, while substrate 12 is kept in a horizontal position, substrate 12 is lifted in a vertical direction at such a slow rate that the surface pressure of monomolecular layer 11 is not substantially lowered. Specifically, substrate 12 is lifted at a rate of 0.01 to 1 mm/min, preferably 0.01 to 0.1 mm/min. The surface pressure can be monitored by conventional surface pressure detector 13 arranged near substrate 12.

As shown in FIG. 1C, when substrate 12 is raised by a predetermined height h (i.e., distance between the lower face of substrate 12 and the water surface), a meniscus produced near substrate 12 spontaneously starts to move towards the center of substrate 12 by a force for maintaining the meniscus. If substrate 12 is kept in this position, a second monomolecular layer positioned near substrate 12 is gradually attached to first monomolecular layer 11 adhered to substrate 12, such that the hydrophilic radicals of the second monomolecular layer are sequentially attached to the hydrophilic radicals of the first monomolecular layer, as shown in FIG. 1D. Finally, as shown in FIG. 1E, second monomolecular layer 14 is formed on first monomolecular layer 11.

The steps shown in FIGS. 1A to 1E can be repeated to form an organic thin film consisting of a number of stacked monomolecular layers.

With reference to FIGS. 2A and 2B, a description will now be given of the conditions under which the meniscus spontaneously starts to move towards the center of substrate 12 when the substrate is lifted by a predetermined height. FIGS. 2A and 2B schematically shows elementary processes of the lateral movement of the meniscus. FIG. 2A corresponds to the left part of FIG. 1C. In FIG. 2A, the contact angle between the meniscus and the substrate is $\theta$. FIG. 2B shows the state wherein the meniscus has moved in the transverse direction from position P1 shown in FIG. 2A to position P2 on substrate 12 by a distance of $\Delta z$.

According to the inventors' thermodynamic study of the stacking mechanism of the monomolecular layers, the internal energy variation ΔU, during the stacking of monomolecular layers by adhesion of hydrophilic radicals under a thermodynamic equilibrium state or a similar state, is represented by the following equation:

$$\Delta U = (yw - \pi)(1 - \cos\theta) l \Delta x + (yxx' - ywx - ywx') l \Delta x \tag{1}$$

where yw indicates a water surface tension, $\pi$ a surface pressure of the monomolecular layer, $\theta$ a contact angle of the meniscus (see FIG. 2), yxx' the interface energy between hydrophilic radicals (X) of one monomolecular layer and hydrophilic radicals (X') of another monomolecular layer contacting said one monomolecular layer, ywx and ywx' the interface energy between hydrophilic radicals (X) and water (W), and the interface energy between hydrophilic radicals (X') and water (W), respectively, $\Delta z$ a distance of movement of the meniscus on the substrate (see FIG. 2B), and l a length of a solid/liquid/gas interface (corresponding, in FIG. 2A, to the width of substrate 12 in a direction perpendicular to the plane of FIG. 2. When the hydrophilic radicals (X) are identical to the hydrophilic radicals (X'), the second term of the right side of equation (1) is changed to -(yxx-2ywx)--. If the second term of the right side of equation (1) has a negative value, monomolecular layers are stacked with the hydrophilic radicals thereof facing one another. On the other, if the second term has a positive value, it is difficult to form a uniform stacking structure since water enters between the facing hydrophilic radicals of the monomolecular layers.

The movement of the meniscus occurs when the following equation (2) is satisfied:

$$\Delta U \leq 0 \tag{2}$$

This equation (2) may be rewritten as follows:

$$1 - (ywx + ywx' - yxx')/(yw - \pi) \leq \cos\theta \tag{3}$$

The relationship between the height h of the substrate from the water surface and cos $\theta$ is represented by the following equation (4):

$$h = \sqrt{2yw/pg} \; \sqrt{1 - \pi/yw} \; \sqrt{1 + \cos\theta} \tag{4}$$

where p is the density of water, and g is the gravitational acceleration.

It is known that the water surface energy yw is 73 dyn/cm. Thus, equation (4) may be rewritten as follows:

$$h = 3.8 \sqrt{1 - \pi/73} \; \sqrt{1 + \cos\theta} \tag{5}$$

The value of $\theta$, which meets equation (3), depends on the type of hydrophilic radical. The inventors, however, have empirically found that this value is in a range of $$0° \leq \theta \leq 90°$$

Thus, if the height h (mm) is set in the following range, $$3.8 \sqrt{1 - \pi/73} \leq h \leq 3.8 \sqrt{1 - \pi/73} \times \sqrt{2} \tag{6}$$

the transverse movement of the meniscus will spontaneously occur.

Specifically, the height h given by formula (6) is calculated in advance, and the height of substrate 12 lifted from the water surface is monitored. When substrate 12 has reached the calculated height h, substrate 12 is held at this height stationarily. Alternatively, while substrate 12 is lifted, a critical height or point, at which the meniscus spontaneously starts to move, is detected, and the lifting of substrate 12 is stopped at the detected critical height. It is possible to attach a load measuring device (electronic balance, or strain gauge) to substrate 12, as means for detecting the critical point.

The lifting operation of the substrate in the above embodiment will now be described with reference to FIG. 3A to FIG. 3E corresponding to FIGS. 1A to 1E. Electronic balance 21 is attached on substrate 12 to measure the load of substrate 12 which is being lifted. If the meniscus does not move when substrate 12 is lifted by a predetermined height, the measured value of load is kept constant. When the meniscus moves transversely, as shown in FIG. 3C, the amount of water raised along with substrate 12 decreases with the lapse of time. Thus, the measured value of load also decreases with the lapse of time. In other words, the condition of formula (6) is satisfied if the measured value of load varies when the substrate is lifted by a predetermined height under the condition of a constant surface pressure.

The load F of substrate 12 in the state wherein substrate 12 is raised by a predetermined height h and the meniscus is pinned near substrate 12 can be represented by the following equation:

$$F = Shpg + L(yw - \pi)\sin\theta \tag{7}$$

where S is a contact area of substrate 12 with monomolecular layer 11, and L is the circumferential length of substrate 12.

The first term of the right side of equation (7) indicates a buoyancy determined by the size of the substrate, and the second term of the right side indicates a surface tension. Thus, as stated above, a Y type stacked film can be formed by the spontaneous movement of the meniscus, if the position of the substrate is held at the detected critical point during the lifting of the substrate with the substrate kept horizontal, at which the value of load F (equation (7)) applied on the substrate starts to change.

In the above embodiment, after the substrate is lifted up to a given height, the substrate is made stationary and the stacking of monomolecular layers is achieved by the spontaneous movement of the meniscus. However, in the actual operation, it is not always necessary to make the substrate stationary. It is also necessary to suitably control the speed of movement of the meniscus, by controlling the speed of lifting the substrate. In other words, the substrate is, at first, held at such a critical height thereabouts that the meniscus spontaneously starts to move. Then, the substrate is lifted once again at a lower speed, thereby to control the speed of movement of the meniscus. For example, compared to the case where the substrate is completely made stationary, it is possible to form a film in a shorter time period, while the thermodynamic equilibrium condition is satisfied. The speed of manufacturing the film can be controlled, by varying the speed of lifting the substrate in a stepwise or continuous manner in consideration of the critical height, without necessarily requiring the temporary stopping of the substrate.

In addition, the speed of movement of the meniscus can be controlled by controlling the surface pressure of the monomolecular layer, after the substrate is raised up to the critical height or thereabouts.

In the second aspect of the present invention, a substrate to which a monomolecular layer is adhered is dipped in water, and the substrate is reversed such that the monomolecular layer faces the water surface. While the angle between the substrate and the water surface is kept at a predetermined angle so that the meniscus of a predetermined angle is formed on the substrate, the substrate to which the monomolecular layer is adhered is brought out of the water, thus transferring another monomolecular layer onto the substrate.

From equation (1), it is understood that it is also important to control the contact angle $\theta$ between the meniscus and the substrate in order to form an organic thin film having a uniform Y type stacking structure. Namely, the contact angle $\theta$ of the meniscus at the time when the substrate is brought out of the water according to the second aspect of the invention is an important parameter for forming a stacked film having high quality. It is necessary to pull the substrate so as to keep the contact angle determined by an interaction between hydrophilic radicals (X and X'). If water enters between the hydrophilic radicals of mutually facing monomolecular layers, the contact angle of the meniscus is reduced to 0° or thereabouts, preventing the formation of an organic thin film having a uniform Y type stacked structure.

In the second aspect of the invention, the speed of lifting the substrate from the water surface is determined such that the speed Vm of movement on the substrate of the meniscus formed on the substrate is 0.01 mm to 10 mm/min, preferably 0.01 mm to 1.0 mm/min. It is desirable that, when the substrate is lifted up, the angle A of the substrate to the water surface is $0° < A \leq 90°$, preferably $0° < A < 5°$. The relationship between Vm and angle A is Vm=L(1−cosA) [L is a distance of movement of the meniscus on the substrate (see FIG. 4D)]. Methods for lifting the substrate include a method of vertically lifting the substrate with a predetermined angle being kept between the substrate and the water surface, a method of pulling the substrate in an inclined direction of the substrate and a method of lifting the substrate out of water in a manner of arc movement. Specifically, the latter method, or the method of lifting the substrate out of water in a manner of arc movement includes (i) a method wherein the substrate in the water is lifted up to the vicinity of the water surface while the substrate is kept parallel to the water surface, and thereafter the substrate is rotated with one side of thereof being employed as a rotational axis, thus lifting the substrate out of water; (ii) a method wherein, while the substrate is kept perpendicular to the water surface, an upper part of the substrate is brought out of water, and thereafter the substrate is rotated with this upper part being employed as a rotational axis, thus lifting the substrate out of water; and a method wherein, after about half the substrate is lifted out of water in methods (i) and (ii), the rotational axis is changed to the opposite side of the substrate to rotate the substrate in the opposite direction, thus lifting the substrate out of water.

One mode of the present invention according to the second aspect of this invention will now be described with reference to FIGS. 4A to 4E.

FIG. 4A corresponds to FIG. 1A, and the description of FIG. 1A is applicable to FIG. 4A.

As shown in FIG. 4B, substrate 12, which has been put in contact with monomolecular layer 11 is horizontally lowered and dipped completely in water. Then, as shown in FIG. 4C, substrate 12 is reversed 180° in water, so that monomolecular layer 11 adhered to substrate 12 is made to face the water surface.

While substrate 12 is kept in a horizontal direction, it is lifted up to the vicinity of the water surface. As shown in FIG. 4D, the angle of substrate 12 to the water surface is set to angle A in the abovedefined range, and substrate 12 is vertically lifted so that the speed of movement of the meniscus falls within the above-defined range. In this case, the contact angle between the meniscus and substrate 12 is kept at $\theta$.

Substrate 12 is completely lifted out of water, and, as shown in FIG. 4E, second monomolecular layer 12 is accumulated on first monomolecular layer 11 while their hydrophilic radicals face one another.

The reversing of substrate 12 in water W and the lifting thereof with an angle are performed by a reversing mechanism. The reversing mechanism is constituted such that a pair of pulleys are arranged above the water surface and in water, a running belt such as a chain belt is passed over the pulleys, and a substrate holding member is attached to the running belt such that the angle of the substrate-holding member to a horizontal plane is adjustable. The reversing mechanism is lifted up and down by a suitable lifting device. Above the water surface, substrate 12 is horizontally held by the substrate-holding member. Substrate 12 is lowered by the lifting device. After substrate 12 is put in contact with monomolecular layer 11, substrate 12 is dipped into water. While substrate 12 is held by the substrate-holding member of the reversing mechanism, the pulleys are driven so that substrate 12 passes over the pulley arranged in water, thus reversing substrate 12. Thereafter, the substrate-holding member is inclined at a predetermined angle by an angle adjusting mechanism. In this state, substrate 12 is raised out of water by the lifting device.

By repeating the steps illustrated in FIGS. 4A to 4E, an organic thin film can be obtained in which a 10 number of monomolecular layers are stacked.

In the second aspect of the invention, the lifting of the substrate from the water surface can also be performed by arc-like movement. The lifting by arclike movement will now be described with reference to FIGS. 5A to 7C.

FIGS. 5A and 5B show a first mode of the lifting of the substrate by the arc-like movement. According to the steps described with reference to FIGS. 4A and 4B, first monomolecular layer 11 is adhered to substrate 12. After substrate 12 is dipped in water, and reversed by 180°, substrate 12 is horizontally lifted up to the vicinity of the water surface, as shown in FIG. 5A. Then, as shown in FIG. 5B, substrate 12 is slowly rotated with one side of substrate 12 being employed as a rotational axis. Substrate 12 is gradually lifted from the other side thereof, such that the contact angle of the meniscus formed on substrate 12 is not reduced to 0°. When substrate 12 is almost raised out of water, the rotation of substrate 12 is stopped. Then, substrate 12 is completely lifted out of water.

FIGS. 6A and 6B show a second mode of the lifting by the arc-like movement. According to the steps described with reference to FIGS. 4A and 4B, first monomolecular layer 11 is adhered to substrate 12. After substrate 12 is dipped in water, it is reversed by 90°, as shown in FIG. 6A. Substrate 12 is set perpendicular to the water surface. Substrate 12 is slowly raised in the vertical direction so that only an upper side thereof projects from the water surface. In this state, substrate 12 is made stationary. Thereafter, substrate 12 is slowly rotated with this upper side being employed as a rotational axis, is raised from the other side so that the contact angle of the meniscus formed on substrate 12 is not reduced to 0°.

FIGS. 7A to 7C show a third mode of the lifting of the substrate by the arc-like movement. According to the steps described with reference to FIGS. 4A and 4B, first monomolecular layer 11 is adhered to substrate 12. After substrate 12 is dipped in water, and reversed by 180°, substrate 12 is horizontally raised up to the vicinity of the water surface, as shown in FIG. 7A. Then, as shown in FIG. 7B, substrate 12 is slowly rotated with one side of substrate 12 being employed as a rotational axis. Substrate 12 is gradually lifted from the other side thereof, such that the contact angle of the meniscus formed on substrate 12 is not reduced to 0°. When half the substrate 12 is almost raised out of water, the rotational axis is shifted to the opposite side of substrate 12 which is still dipping in water, as shown in FIG. 7C. Then, substrate 12 is slowly rotated once again about this rotational axis, and it is completely lifted out of water so that the contact angle of the meniscus formed on substrate 12 is not reduced to 0°.

Examples of the present invention will now be described.

Example 1

A 0.5 mM aqueous solution of cadmium chloride was filled in a trough. A chloroform solution of a stearic acid was developed over the surface of the solution of cadmium chloride, and was compressed so as to have a surface pressure of 25 dyn/cm, thereby to form a monomolecular layer. A silicon substrate having a thermal-oxidized film formed thereon was used as a substrate. After the silicon substrate was rinsed and dried, it was left in a gas-phase atmosphere of a hexamethyldisilazane for 24 hours and was made hydrophobic. The substrate was lowered in parallel to the surface of the water in the trough. When the substrate was put in contact with a stearic acid monomolecular layer, it was held in this position. Thereafter, the substrate was slowly lifted up in parallel to the liquid surface, at such a rate that the surface pressure was not lowered. when the substrated lifted up to a height of 3.3 mm from the liquid surface, it was held at this height. Then, a meniscus formed in the vicinity of the substrate started to move towards the center of the substrate. Finally, the substrate was separated from the liquid surface.

The above process was repeated five times, thereby to obtain a ten-layer stacked film of stearic acid. The obtained film was tested by using X-rays, TEM (Transmission Electron Microscope), and SEM (Scanning Electron Microscope). As a result, it was found that the obtained film was an LB film which was free from disturbance in periodic structure in the direction of lamination of layers, and was uniform in quality and was free from defects.

Example 2

Pure water was put in a trough. A chloroform solution of donor molecules (I), which is represented by the following formula and has a skeleton of paraphenylenediamine, was spread over the water surface.

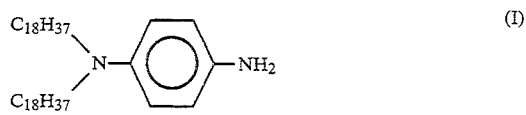
(I)

The chloroform solution was compressed so as to have a surface pressure of 40 dyn/cm, thus forming a monomolecular layer. As in Example 1, ten monomolecular layers were stacked on a hydrophobicized silicon substrate, to obtain an organic thin film.

The obtained film was tested by X-ray diffraction, TEM and SEM. It was found that the obtain film was a film which was free from disturbance in periodic structure in the direction of lamination of layers, and was uniform in quality and was free from defects.

Example 3

Pure water was put in a trough. A chloroform solution of acceptor molecules (II), which is represented by the following formula and has a skeleton of quinodiimine, was spread over the water surface.

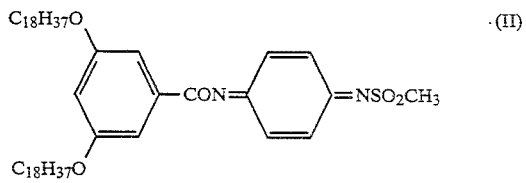
(II)

The chloroform solution was compressed so as to have a surface pressure of 30 dyn/cm, thus forming a monomolecular layer. As in Example 1, ten monomolecular layers were stacked on a hydrophobicized silicon substrate, to obtain an organic thin film.

The obtained film was tested by X-ray diffraction, TEM and SEM. It was found that the obtain film was a film which was free from disturbance in periodic structure in the direction of lamination of layers, and was uniform in quality and was free from defects.

Example 4

Under the basically same conditions as in Examples 1 to 3, while a load of a substrate was monitored by an electronic balance, the critical height of the lifted substrate was determined, thereby to obtain an LB laminated film. As s result, an excellent film was obtained.

Example 5

The process, in which the speed of lifting the substrate was changed near the critical height of the substrate to control the speed of movement of the meniscus, was applied to Examples 1 to 3. As a result, an excellent film was obtained.

Example 6

As in Example 1, a stearic acid monomolecular layer was spread on the water surface. After a hydrophobic substrate was brought into contact with the water surface in parallel, the substrate was raised from the water surface in parallel. Unlike in Example 1, the substrate was made stationary before the start of movement of the meniscus. In this state, the surface pressure of the monomolecular layer was slowly raised. As a result, the meniscus started to slowly move towards the center of the substrate, and a Y type stacked film of a stearic acid was obtained as in Example 1. The obtained ten-layer stacked film was tested, and it was confirmed that the film was excellent, as in Example 1.

Example 7

A 0.5 mM aqueous solution of cadmium chloride was filled in a trough. A chloroform solution of a stearic acid was spread over the surface of the solution of cadmium chloride, and was compressed so as to have a surface pressure of 25 dyn/cm, thereby to form a monomolecular layer. A substrate used in this Example was formed by rinsing and drying a thermal-oxidized silicon wafer and then leaving the wafer in a gas-phase atmosphere of a hexamethyldisilazane for 24 hours for making the substrate surface hydrophobic.

The substrate was lowered in parallel to the surface of the liquid in the trough. After the substrate was put in contact with the monomolecular layer (FIG. 4A), it was further lowered and dipped into water (FIG. 4B). The substrate was rotated 180° in water (FIG. 4C) so that the monomolecular layer-adhered surface of the substrate faces the water surface. Then, the substrate was lifted up to a point about 1 mm below the water surface.

The substrate was kept at an angle of about 5° to the water surface, and it was lifted out of the water while the speed of movement of the meniscus over the surface of the substrate was set to 0.5 mm/min (FIG. 4D). In this case, the contact angle of the meniscus formed on the substrate was about 60°. While the substrate was raised and lifted completely out of water, this contact angle was kept, and the substrate, as shown in FIG. 4E, was obtained.

This process was repeated five times to obtain a ten-layer stacked film of stearic acid. This film was tested by X-ray diffraction, TEM and SEM. It was found that the obtained film was free from disturbance in periodic structure in the direction of lamination of layers, and was uniform in quality and was free from defects.

Similar processes were performed by changing the angle of the substrate to the water surface, for example, about 10°, about 20°, and about 30°. In each process, an excellent film was obtained.

Example 8

Pure water was put in a trough. A chloroform solution of donor molecules (I), which is represented by the following formula and has a skeleton of paraphenylenediamine, was spread over the water surface.

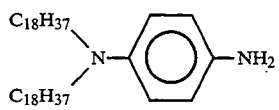

(I)

The chloroform solution was compressed so as to have a surface pressure of 40 dyn/cm, thus forming a monomolecular layer. As in Example 7, ten monomolecular layers were laminated on a silicon substrate which was dehydrated, to obtain an organic thin film. The obtained film was tested by X-ray diffraction, TEM and SEM. It was found that the obtain film was a film which was free from disturbance in periodic structure in the direction of lamination of layers, and was uniform in quality and was free from defects.

Example 9

Pure water was put in a trough. A chloroform solution of acceptor molecules (II), which is represented by the following formula and has a skeleton of quinodiimine, was spread over the water surface.

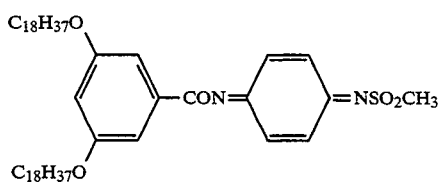

(II)

The chloroform solution was compressed so as to have a surface pressure of 30 dyn/cm, thus forming a monomolecular layer.

As in Embodiment 7, ten monomolecular layers were laminated on a silicon substrate which was dehydrated, to obtain an organic thin film.

The obtained film was tested by X-ray diffraction, TEM and SEM. It was found that the obtained film was a film which was free from disturbance in periodic structure in the direction of lamination of layers, and was uniform in quality and was free from defects.

Example 10

A 0.5 mM aqueous solution of cadmium chloride was filled in a trough. A chloroform solution of a stearic acid was spread over the surface of the solution of cadmium chloride, and was compressed so as to have a surface pressure of 25 dyn/cm, thereby to form a monomolecular layer. A silicon substrate coated with a thermal-oxidized film was used as a substrate. After the silicon substrate was rinsed and dried, it was left in a gas-phase atmosphere of a hexamethyldisilazane for 24 hours and made hydrophobic.

The substrate was lowered in parallel to the surface of the liquid in the trough. After the substrate was put in contact with a monomolecular layer, it was further lowered and dipped in water. The substrate was rotated 180° in water so that the surface of the substrate faces the water surface in parallel. Then, the substrate was raised up to a point about 1 mm below the water surface (FIG. 5A). The substrate was slowly rotated with one side being employed as a rotational axis, and was gradually raised from the other side thereof such that the contact angle of the meniscus formed on the substrate was not reduced to 0° or thereabouts (FIG. 5B). When the substrate was lifted almost completely from the water surface, the rotation of the substrate was stopped and then completely lifted from the water surface. This process was repeated five times to form a ten-layer laminated film of stearic acid. The obtained laminated film was tested by x-ray diffraction, TEM, and SEM. As a result, it was found that the obtain film was free from disturbance in periodic structure in the direction of lamination of layers, and was uniform in quality and was free from defects.

Example 11

As in Embodiment 10, a stearic acid monomolecular layer was formed over the water surface. A silicon substrate, which was subjected to a dehydrating treatment, was lowered in parallel to the water surface. After the substrate was brought into contact with the monomolecular layer, it was further lowered and dipped into water. In the water, the substrate was positioned perpendicular to the water surface. The substrate was slowly raised perpendicularly to the water surface (FIG. 6A), and was made stationary at a point about 3 mm above the water surface.

The substrate was slowly rotated so as to its surface faces the water surface with one side thereof being employed as a rotational axis. Then, the substrate was slowly raised such that the contact angle of a meniscus formed on the substrate was not decreased to 0° or thereabouts (FIG. 6B). Finally, the substrate was lifted completely out of water. This process was repeated five times to form a ten-layer laminated film of stearic acid. The obtained laminated film was tested by X-ray diffraction, TEM, and SEM. As a result, it was found that the obtain film was free from disturbance in periodic structure in the direction of lamination of layers, and was uniform in quality and was free from defects.

Example 12

As in Embodiment 10, a stearic acid monomolecular layer was formed over the water surface. A silicon substrate, which was subjected to a dehydrating treatment, was lowered in parallel to the water surface. After the substrate was brought into contact with the monomolecular layer, it was further lowered and dipped into water. The substrate was rotated 180° in water so that the surface of the substrate faces the water surface in parallel. Then, the substrate was raised up to a point about 1 mm below the water surface (FIG. 7A). The substrate was slowly rotated with one side being employed as a rotational axis, and was gradually raised from the other side thereof such that the contact angle of the meniscus formed on the substrate was not reduced to 0° or thereabouts (FIG. 7B). When half the substrate was lifted above the water surface, the rotational axis was shifted to the other side of the substrate which projects from the water surface. Then, the substrate was slowly rotated once again, and it was completely lifted above the water surface such that the contact angle of a meniscus formed on the substrate was not decreased to 0° or thereabouts (FIG. 7C). This process was repeated five times to form a ten-layer laminated film of stearic acid. The obtained laminated film was tested by X-ray diffraction, TEM, and SEM. As a result, it was found that the obtain film was free from disturbance in periodic structure in the direction of lamination of layers, and was uniform in quality and was free from defects.

Example 13

Pure water was put in a trough. A chloroform solution of donor molecules (I), which is represented by the following formula and has a skeleton of paraphenylenediamine, was spread over the water surface.

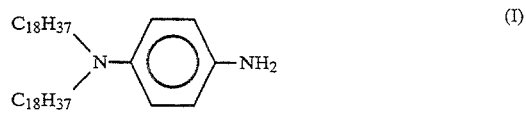

The chloroform solution was compressed so as to have a surface pressure of 40 dyn/cm, thus forming a monomolecular layer. As in Example 7, 8 or 9, ten monomolecular layers were laminated on a silicon substrate which was dehydrated, to obtain an organic thin film. The obtained film was tested by X-ray diffraction, TEM and SEM. It was found that the obtain film was a film which was free from disturbance in periodic structure in the direction of lamination of layers, and was uniform in quality and was free from defects.

Example 14

Pure water was put in a trough. A chloroform solution of acceptor molecules (II), which is represented by the following formula and has a skeleton of quinodiimine, was spread over the water surface.

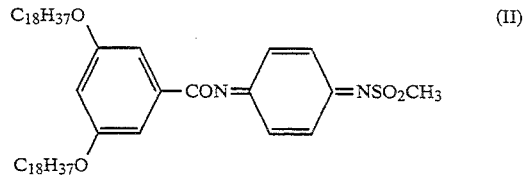

The chloroform solution was compressed so as to have a surface pressure of 30 dyn/cm, thus forming a monomolecular layer.

As in Example 7, 8 or 9, ten monomolecular layers were laminated on a silicon substrate which was dehydrated, to obtain an organic thin film. The obtained film was tested by X-ray diffraction, TEM and SEM. It was found that the obtain film was a film which was free from disturbance in periodic structure in the direction of lamination of layers, and was uniform in quality and was free from defects.

Example 15

A 0.5 mM aqueous solution of cadmium chloride was filled in a trough. A chloroform solution of a stearic acid was spread over the surface of the solution of cadmium chloride, and was compressed so as to have a surface pressure of 25 dyn/cm, thereby to form a monomolecular layer. A silicon substrate coated with a thermal-oxidized film was used as a substrate. After the silicon substrate was rinsed and dried, it was left in a gas-phase atmosphere of a hexamethyldisilazane for 24 hours and was made hydrophobic.

The substrate was lowered in parallel to the surface of the liquid in the trough. After the substrate was put in contact with a monomolecular layer, it was further lowered and dipped into water. The substrate was rotated 90° in water so that the substrate was positioned in the vertical direction. The substrate was lifted out of the water while the speed of movement of the meniscus over the surface of the substrate was set to 0.5 mm/min. In this case, the contact angle of the meniscus formed on the substrate was about 60°. While the substrate was raised and lifted completely out of water, this contact angle was kept.

This process was repeated five times to obtain a ten-layer laminated film of stearic acid. This film was tested by X-ray diffraction, TEM and SEM. It was found that the obtain film was free from disturbance in periodic structure in the direction of lamination of layers, and was uniform in quality and was free from defects.

Example 16

Pure water was put in a trough. A chloroform solution of donor molecules (I), which is represented by the following formula and has a skeleton of paraphenylenediamine, was spread over the water surface.

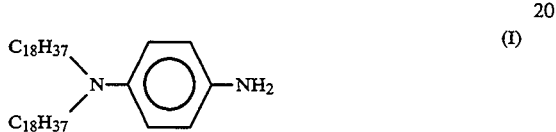

The chloroform solution was compressed so as to have a surface pressure of 40 dyn/cm, thus forming a monomolecular layer. As in Example 14, ten monomolecular layers were laminated on a silicon substrate which was dehydrated, to obtain an organic thin film. The obtained film was tested by X-ray diffraction, TEM and SEM. It was found that the obtain film was a film which was free from disturbance in periodic structure in the direction of lamination of layers, and was uniform in quality and was free from defects.

Example 17

Pure water was put in a trough. A chloroform solution of acceptor molecules (II), which is represented by the following formula and has a skeleton of quinodiimine, was spread over the water surface.

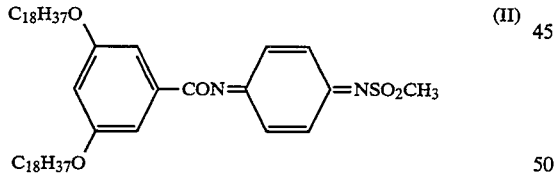

The chloroform solution was compressed so as to have a surface pressure of 30 dyn/cm, thus forming a monomolecular layer.

As in Example 14, ten monomolecular layers were laminated on a silicon substrate which was dehydrated, to obtain an organic thin film. The obtained film was tested by X-ray diffraction, TEM and SEM. It was found that the obtain film was a film which was free from disturbance in periodic structure in the direction of lamination of layers, and was uniform in quality and was free from defects.

What is claimed is:

1. A method of forming an organic film comprising the steps of:

developing organic molecules having a dye radical or organic polymer molecules on a water surface, said molecules having a hydrophilic portion and a hydrophobic portion, and compresing the molecules thereby to form a monomolecular layer having a surface pressure;

bringing said monomolecular layer into contact with a substrate, thus adhering the monomolecular layer to the substrate; and pulling up the substrate to which the monomolecular layer is adhered, at such a rate that the surface at the interface with the substrate is not substantially lowered at said substrate by measuring the surface pressure of the monomolecular layer on the water surface, thus transferring the monomolecular layer onto the substrate.

2. A method of forming an organic film comprising the steps of:

developing organic molecules having a hydrophilic portion and a hydrophobic portion on a water surface, and compressing the molecules thereby to form a monomolecular layer having a surface pressure;

bringing a substrate having a flat surface into contact with a first portion of said monomolecular layer while said flat surface of said substrate is kept in a horizontal direction, thereby it adhere a first monomolecular layer to said flat surface of said substrate;

dipping the substrate, to which the first monomolecular layer is adhered, entirely within the water; and lifting the dipped substrate above the water surface to contact said first monomolecular layer with a second portion of a monomolecular layer, existing on the water surface, thereby sequentially transferring a second portion of said monomolecular layer to form a second monomolecular layer on said first monomolecular layer, while the first monomolecular layer on said flat surface on the substrate is made to face the water surface, and said flat surface of the substrate is kept inclined by an angle within a range of more than 0° and not more than 90° with respect to the water surface effective to prevent water from entering the hydrophilic portions of the mutually facing first and second monomolecular layers thereby to laminate said second portion of the monomolecular layer onto the first monomolecular layer.

3. The method according to claim 2, wherein the angle of the substrate to the water surface is more than 0° and less than 5°.

4. The method according to claim 2, wherein the substrate is lifted in the vertical direction.

5. The method according to claim 2, wherein said organic molecules are organic molecules having a dye radical or polymer molecules.

6. A method of forming an organic film comprising the steps of:

developing organic molecules having a hydrophilic portion and a hydrophobic portion on a water surface, and compressing the molecules thereby to form a monomolecular layer having a surface pressure;

bringing a substrate having a flat surface into contact with a first portion of said monomolecular layer while said flat surface of said substrate is kept in a horizontal direction, thereby to adhere a first monomolecular layer to said flat surface of said substrate;

dipping the substrate, to which the first monomolecular layer is adhered, entirely within the water; and reversing the dipped substrate in the water such that the first monomolecular layer on the substrate faces the water surface;

lifting the reversed substrate above the water surface, thereby to stack a second portion of a monomolecular layer existing on the water surface onto the first monomolecular layer to form a second monomolecular layer; and causing a meniscus formed at the substrate by the water to move over the flat surface of the substrate so that an angle between the flat surface of the substrate and the meniscus formed at the time of lifting the substrate is kept substantially equal to an angle determined by mutual interaction between the hydrophilic portions of the first and second monomolecular layers such that the water does not enter the hydrophilic portions of the mutually facing first and second monomolecular layers.

7. The method according to claim 6, wherein the meniscus is moved at a rate of 0.01 to 10 mm/min.

8. The method according to claim 6, wherein said organic molecules are organic molecules having a dye radical or polymer molecules.

9. A method of forming an organic film comprising the steps of:

developing organic molecules having a hydrophilic portion and a hydrophobic portion on a water surface, and compressing the molecules thereby to form a monomolecular layer having a surface pressure;

bringing said monomolecular layer into contact with a substrate while said substrate is kept in a horizontal direction, thus adhering the monomolecular layer to the substrate; and pulling up the substrate to which the monomolecular layer is adhered, at such a rate that the surface pressure of the monomolecular layer on the water surface at the interface with the substrate is not substantially lowered at said substrate by measuring the surface pressure of the monomolecular layer on the water surface, thus transferring the monomolecular layer onto the substrate.

10. A method of forming an organic film comprising the steps of:

developing organic molecules having a hydrophilic portion and a hydrophobic portion on a water surface, and compressing the molecules thereby to form a monomolecular layer of a set surface pressure;

bringing a flat surface substrate into contact with a first portion of said monomolecular layer, thus adhering said first portion of the monomolecular layer on the water surface to the substrate, thereby forming a first monomolecular layer on said substrate; and pulling up said substrate, to which said first monomolecular layer is adhered, at such a rate that the surface pressure of the monomolecular layer on the water surface at the interface is not substantially lowered at said substrate, while monitoring the surface pressure of the monomolecular layer at said substrate, thereby transferring, onto said first monomolecular layer on said substrate, a second portion of the monomolecular layer existing on the water surface around said first portion of the monomolecular layer on the water surface to form a second monomolecular layer on said first monomolecular layer on said substrate.

* * * * *